United States Patent Office 2,819,269
Patented Jan. 7, 1958

2,819,269
CARBALKOXY PIPERAZINE COMPOUNDS

Arthur W. Weston, Waukegan, and Kenneth E. Hamlin, Jr., Lake Bluff, Ill., assignors to Abbott Laboratories, Chicago, Ill., a corporation of Illinois No Drawing. Application July 9, 1956
Serial No. 596,389

4 Claims. (Cl. 260—268)

Our invention relates to new chemical compounds and more particularly to certain heterocyclic compounds, containing as the essential constituents an N,N'-disubstituted piperazine ring.

The novel compounds of our invention are particularly useful as chemical intermediates for producing compounds found to possess capacity for producing physiological effects which will be described hereinafter in detail. For example, it has been observed that these later-described compounds are useful in combating the symptoms of histamine activity and show antispasmodic activity when tested on smooth muscle.

The present invention comprises novel compounds containing the piperazine ring and having the following formula:

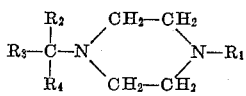

wherein $R_1$ is a carbalkoxy group, $R_2$ is a hydrogen atom or a lower alkyl group, $R_3$ is a phenyl or halophenyl group, and $R_4$ is a phenyl, halophenyl, pyridyl, thienyl, or cyclohexyl group. In the preferred embodiment, $R_3$ and $R_4$ form a part of a benzhydryl group and the benzhydryl group is preferably substituted with one or more halogen, alkyl, alkoxy, or similar functional substituent.

In general, the products of the present invention are prepared by reacting an $R_3R_4$-halide with an N-carbalkoxypiperazine, as will be illustrated by the specific examples.

In the following examples showing several specific embodiments of the present invention, it should be understood that the invention is not to be limited to the particular reactants, the precise proportions or the conditions set forth in the several specific examples, since these examples are given only for the purpose of illustrating the principle of the present invention.

EXAMPLE I

*N-benzhydryl-N'-carbethoxypiperazine*

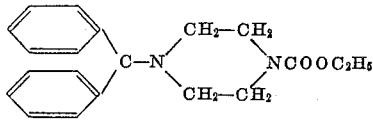

N-carbethoxypiperazine, 29.8 g., benzhydryl bromide, 46.5 g., sodium carbonate, 21.2 g., and 125 cc. of dry xylene are refluxed four hours to yield N-benzhydryl-N'-carbethoxypiperazine, M. P. 114° C.

The above compound may be further treated by refluxing with concentrated hydrochloric acid or potassium hydroxide to split out the carbethoxy group to produce N-benzhydrylpiperazine.

EXAMPLE II

*N-benzhydrylpiperazine*

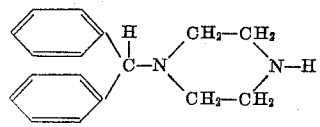

A mixture of 14 g. of N-benzhydryl-N'-carbethoxypiperazine and 56 g. of potassium hydroxide in 250 cc. of 95% ethanol is refluxed for 22 hours. After removal of the alcohol in vacuo, the residue is treated with water and extracted with ether. The ether extract is dried and then distilled. The benzhydrylpiperazine distills at 183–190° C. at 1 mm. pressure and then crystallizes, M. P. 70–72° C.; the base is converted to the d-tartaric acid salt, M. P. 195° C. with decomposition after recrystallization from absolute ethanol.

EXAMPLE III

*N-(p-chlorobenzhydryl)-N'-carbethoxypiperazine*

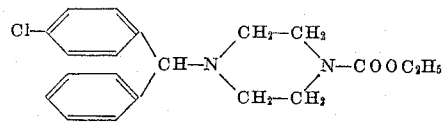

A mixture of 12.6 g. of N-carbethoxypiperazine, 18.96 g. of p-chlorobenzhydryl chloride, 7.0 g. of sodium bicarbonate and 100 cc. of dry toluene is refluxed and stirred sixteen hours. After the addition of water, the hydrocarbon layer is dried and hydrogen chloride gas added. The dihydrochloride of the N-(p-chlorobenzhydryl)-N'-carbethoxypiperazine is thus obtained as a white solid.

This type of compound is useful in the synthesis which removes the N-carbethoxy group by hydrolysis and decarboxylation. For example, by refluxing the above-mentioned compound with concentrated hydrochloric acid, the compound N-p-chlorobenzhydrylpiperazine is obtained.

EXAMPLE IV

*N-p-chlorobenzhydrylpiperazine*

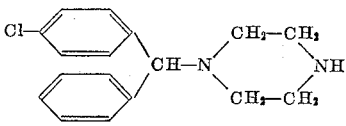

A mixture of 15 g. of N-(p-chlorobenzhydryl)-N'-carbethoxypiperazine and 37 g. of HCl in 250 cc. of 95% ethanol is refluxed for about 25 hours. After removal of the alcohol in vacuo, the residue is treated with water and extracted with ether. The ether extract is dried and distilled. The N-p-chlorobenzhydrylpiperazine distills at 224° C. at 1 mm. pressure.

Compounds having the general formula:

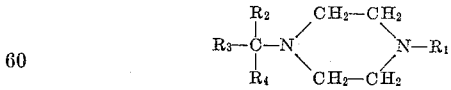

wherein $R_1$ is methyl or ethyl and $R_2$, $R_3$, and $R_4$ have the above values and which are useful in combating the symptoms of histamine activity can be prepared from the piperazine compounds having the formula:

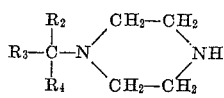

by reacting this compound with either formaldehyde or acetaldehyde in conjunction with formic acid in which case the substituted $R_1$ is methyl or ethyl, respectively.

The polymer of formaldehyde, paraformaldehyde or formalin, may be used in place of formaldehyde.

EXAMPLE V

*N-(p-chlorobenzhydryl)-N'-methylpiperazine*

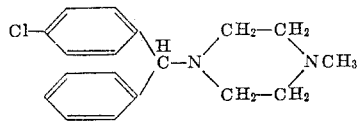

A mixture of 30 g. of N-(p-chlorobenzhydryl)piperazine, 10.3 g. of formaldehyde (35%), and 7.6 g. of formic acid (90%) is placed in a round bottom flask and heated on a steam bath for three hours and thereafter refluxed for four and one-half hours. Concentrated hydrochloric acid (7.7 g.) is added and the excess formaldehyde and formic acid removed by distillation at reduced pressure. The residue is dissolved in water and made alkaline by the addition of a solution of 40% sodium hydroxide. The oil which separates is extracted three times with benzene and the benzene extracts concentrated on a steam bath and the residues distilled. The N-(p-chlorobenzhydryl)-N'-methylpiperazine product boils at a temperature of 178–181° C. at a pressure of 1.0 mm. The monohydrochloride salt of the product has a melting point of 221–222° C.

EXAMPLE VI

*N-(p-chlorobenzhydryl)-N'-ethylpiperazine*

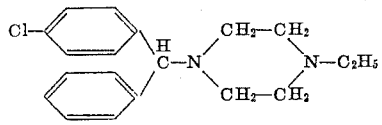

Following the procedure outlined in Example V, 30 g. of N-(p-chlorobenzhydryl)-piperazine, 5.3 g. of acetaldehyde, and 7.6 g. of formic acid (90%) are heated on a steam bath for three hours and refluxed for five hours to produce the N'-ethylated piperazine product. The dihydrochloride of the latter product has a melting point of 227–228° C.

By employing the procedures described in Examples V and VI, the following methyl and ethyl substituted piperazines are prepared: N-(p-bromobenzhydryl)-N'-methylpiperazine, N-benzhydryl-N'-methylpiperazine, N-(p-methoxybenzhydryl)-N'-methylpiperazine, N-(p,p'-dichlorobenzhydryl)-N'-methylpiperazine, N-benzhydryl-N'-ethylpiperazine, N-(p-iodobenzylhydryl)-N'-methylpiperazine, N-[α-(2-pyridyl)-benzyl]-N'-methylpiperazine, N-(p-fluorobenzhydryl)-N'-methylpiperazine, N-(p-methylbenzhydryl)-N'-methylpiperazine, N-(α-cyclohexyl-p-chlorobenzyl)-N'-methylpiperazine, N-(o-chlorobenzhydryl)-N'-methylpiperazine, N-(α-2-thienylbenzyl)-N'-methylpiperazine, N-(m-chlorobenzhydryl)-N'-methylpiperazine, N-(α-2-thienyl-p-chlorobenzyl)-N'-methylpiperazine, N-(α-methylbenzhydryl)-N'-methylpiperazine, N-[α-(2-furyl)-benzyl]-N'-methylpiperazine, and N-(α-cyclophenyl)-benzyl-N'-methylpiperazine.

As a modification of the foregoing method of introducing a methyl or ethyl group by reducing an aldehyde, it is possible to effect reduction of the aldehyde with a metal catalyst and hydrogen in place of the formic acid used in Examples V and VI. Thus, for example, zinc and hydrochloric acid are used in a reaction mixture containing benzhydryl piperazine and acetaldehyde to produce the benzhydryl-N'-ethylpiperazine. Similarly, Raney nickel and absolute ethyl alcohol are used in reaction mixture containing benzhydryl piperazine and formaldehyde to introduce the methyl radical into the piperazine ring in a manner similar to that described in the foregoing examples.

This application is a continuing application of applicants' co-pending application Serial No. 299,904, filed July 19, 1952, which was a continuation-in-part application of the applicants' then co-pending patent application Serial No. 86,394, filed April 8, 1949, which was a continuation-in-part of the applicants' earlier application Serial No. 52,124, filed September 30, 1948.

Others may readily adapt the invention for use under various conditions of service, by employing one or more of the novel features disclosed or equivalents thereof. As at present advised with respect to the apparent scope of our invention, we desire to claim the following subject matter.

We claim:

1. A member of the class consisting of compounds represented by the formula:

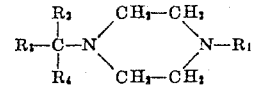

wherein $R_1$ is a carbalkoxy group containing up to four carbon atoms inclusive, $R_2$ is a member selected from the class consisting of hydrogen and an alkyl group containing up to four carbon atoms inclusive, $R_3$ is selected from the group consisting of phenyl and halophenyl, and $R_4$ is selected from the group consisting of phenyl, halophenyl, pyridyl, thienyl, and cyclohexyl.

2. An N-(benzhydryl)-N'-lower carbalkoxypiperazine.

3. The compound N-(p-chlorobenzhydryl)-N'-carbethoxypiperazine.

4. The compound N-benzhydryl-N'-carbethoxypiperazine.

No references cited.